US012808983B2

(12) United States Patent
Ibrahim et al.

(10) Patent No.: US 12,808,983 B2
(45) Date of Patent: Nov. 24, 2026

(54) FREQUENCY AND TIMING OFFSET DETERMINATION IN DISTRIBUTED RADAR SYSTEMS

(71) Applicant: NXP B.V., Eindhoven (NL)

(72) Inventors: Alaa Salaheldin Gomaa Ibrahim, Dresden (DE); Marco Jan Gerrit Bekooij, Empel (NL)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 18/988,043

(22) Filed: Dec. 19, 2024

(65) Prior Publication Data

US 2026/0177663 A1 Jun. 25, 2026

(51) Int. Cl.
*G01S 7/35* (2006.01)
*G01S 13/00* (2006.01)
*G01S 13/58* (2006.01)

(52) U.S. Cl.
CPC ............ *G01S 7/356* (2021.05); *G01S 13/003* (2013.01); *G01S 13/584* (2013.01)

(58) Field of Classification Search
None
See application file for complete search history.

(56) References Cited

U.S. PATENT DOCUMENTS 5,640,431 A * 6/1997 Bruckert ................ H04B 1/707 375/150
5,999,561 A * 12/1999 Naden .................... H04B 1/707 375/142
6,639,939 B1 * 10/2003 Naden .................... H04B 1/707 375/140
7,346,135 B1 * 3/2008 Narasimhan .......... H04L 7/0016 375/354

(Continued)

FOREIGN PATENT DOCUMENTS

CN 117319152 A * 12/2023 ......... H04L 27/0014
WO WO2024/172242 A1 * 8/2024 ........... H04L 5/0094

OTHER PUBLICATIONS

Gottinger, M., Kirsch, F., Gulden, P., & Vossiek, M. (2019). Coherent full-duplex double-sided two-way ranging and velocity measurement between separate incoherent radio units. IEEE Transactions on Microwave Theory and Techniques, 67(5), 2045-2061.

*Primary Examiner* — Bernarr E Gregory

(57) ABSTRACT

An apparatus and method for determining a frequency reference offset between a transmitter and a receiver. Time sample vectors are created with each having a time sample sequence of a received chirp period within a sequence of chirp periods. A product vector for each pair of time sample vectors is calculated for each pair of time sample vectors in the time sample vectors. Each product vector of each pair of time sample vectors is summed into an accumulated value vector. A Discrete Fourier Transform of the accumulated (Continued)

value vector is calculated. A detected frequency is determined based on a frequency corresponding to an element of the Discrete Fourier Transform that has an amplitude higher than other elements of the Discrete Fourier Transform. A frequency reference offset between a transmitter of the received chirp period and a receiver of the received chirp period is determined based on the detected frequency.

20 Claims, 8 Drawing Sheets

(56) References Cited

U.S. PATENT DOCUMENTS

| | | | | |
|---|---|---|---|---|
| 2009/0213943 | A1* | 8/2009 | Gu | H04L 25/0204 375/260 |
| 2020/0300965 | A1* | 9/2020 | Wu | G01S 13/003 |
| 2020/0300995 | A1* | 9/2020 | Wu | G01S 13/003 |
| 2024/0210520 | A1 | 6/2024 | Wu et al. | |
| 2024/0219515 | A1 | 7/2024 | Wu et al. | |
| 2025/0373392 | A1* | 12/2025 | Bae | H04L 5/005 |

* cited by examiner

100

200

300

400

600

700

800

FREQUENCY AND TIMING OFFSET DETERMINATION IN DISTRIBUTED RADAR SYSTEMS

BACKGROUND

Field

Embodiments of the present invention generally relate to distributed radar systems, and more particularly, relate to determination of reference clock frequency and timing offsets between separated radar transceivers.

Related Art

A Distributed Coherent Radar (DCR) system includes multiple radar transmitters and receivers that are physically separated from one another but that operate together by coherently combining received reflected radar signals that originate from other transmitters in the system. The operation of such physically separated transmitters and receivers is improved by proper synchronization of the time and frequency references used for signal transmission and reception of such physically separated radars.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
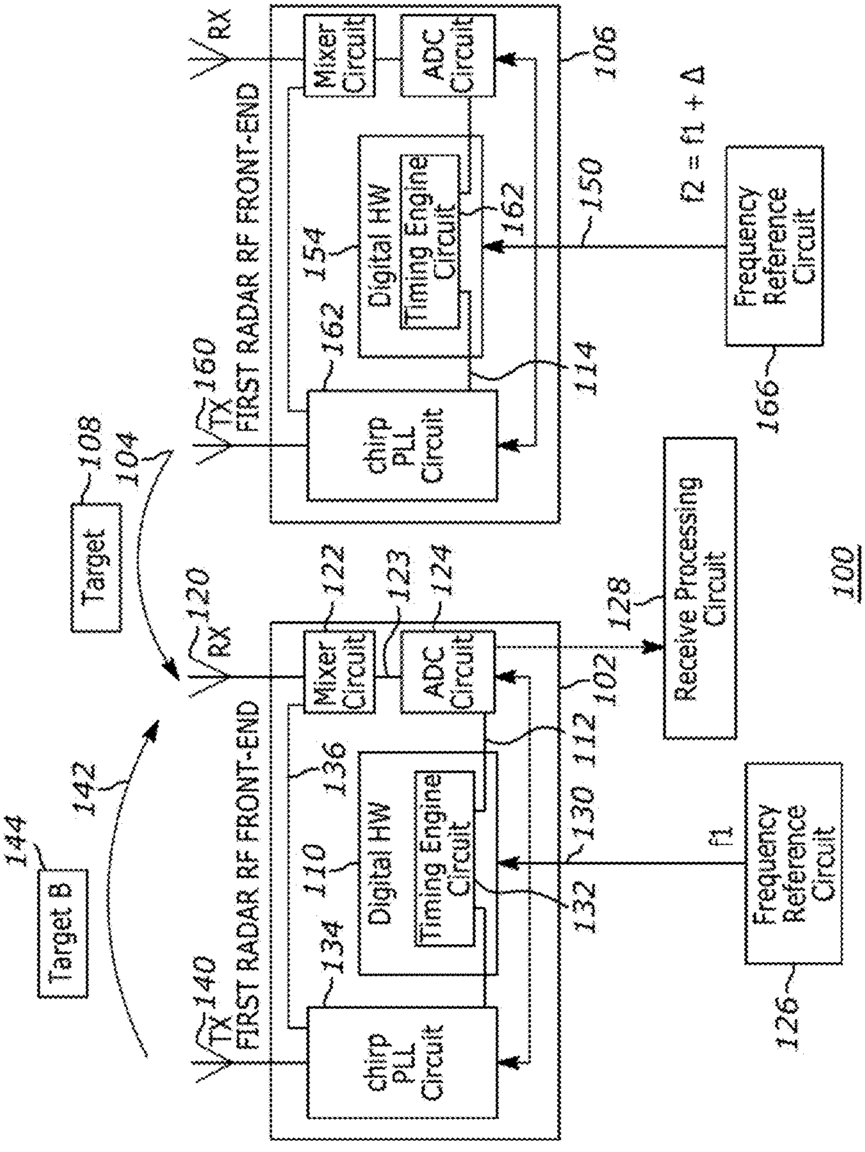
FIG. 1 illustrates a bistatic radar system, according to an example.

The below described systems and methods operate to determine or estimate frequency offsets between frequencies generated by transmitters and the frequencies used by receivers in a distributed coherent radar system. The below described systems and methods operate to estimate the frequency offset between a remote transmitter and a receiver by determining and tracking the baseband frequency drift of a received Frequency Modulated Continuous Wave (FMCW) signal that is transmitted by a remote bistatic radar transmitter over several chirp periods. The below description uses a bistatic radar system for simplicity but it is to be understood that the below described systems and methods are readily adapted to multistatic radar systems.

Distributed coherent radar systems in some examples that include the below-described systems and methods include two or more components, each of which is referred to herein as a "radar RF front end" which includes one or more receivers, transmitters, receiver transmitter pairs, or any combinations of these. In an example, these radar RF front ends are part of a multi-static Frequency Modulated Continuous Wave (FMCW) radar system. Each RF front end in such an example includes a transmitter that generates and transmits a frequency modulated (FM) RF signal. Each RF front end in such an example includes a receiver that operates to receive RF signals that are transmitted by one or more RF front end of that radar system, RF front ends of other radar systems that are part of the distributed coherent radar system, or combinations of those. In an example, each radar RF front end generates and transmits a chirped FMCW RF waveform that consists of a sequence of a number of "chirps" where each chirp waveform has an RF frequency ramp for a defined time interval. In further examples, continuous wave radars, other distributed coherent radars, or combinations of these, are able to modulate the transmitted continuous wave RF waveform signal with using suitable technique.

The RF transmission, and thus reception, by each radar RF front end in some distributed coherent systems is synchronized so that all transmitted waveforms occur at the same time and the receivers are able to properly receive those signals. Each radar RF front end in such distributed coherent radar systems has a reference oscillator that controls, for example, radio frequency signal local oscillators (LOs), chirp ramp timing clocks, sampling by analog to digital converters, operational aspects of other components, or combinations of these. In some examples, the below described systems and methods include radar RF front ends that each has a timing controller that produces a timing signal that controls timing of transmission and reception of the FMCW waveforms used by the multistatic radar system. Frequency offsets between the reference oscillators in the transmitter and receiver of such bistatic systems can degrade the accuracy of the radar's operation.

The below described systems and methods provide several advantages relative to conventional approaches. The below systems and methods operate to determine frequency offsets between transmitter and receiver frequency references by estimating crystal frequency offsets between the transmitter and receiver using only a single bistatic spectra and when only one sensor is transmitting at a time. The below systems and methods do not require a strong/reference target in the scene and do not require using positive and negative slope chirp sequences. These systems and methods can be implemented with reduced complexity relative to conventional systems and allow improved estimation of frequency offsets by processing two bistatic spectra.

The below described systems and methods do not require two bistatic spectra to estimate frequency offsets, do not require the presence of a reference/strong target, and do not require using positive and negative slope chirp sequences and support of positive and negative beat frequencies. The below described systems and methods are applicable in application where a magnitude of a Phase Locked Loop (PLL) induced Doppler offset within the bistatic signal processing is not known.

FIG. 1 illustrates a bistatic radar system 100, according to an example. The illustrated bistatic radar system depicts two radar Radio Frequency (RF) front ends that are part of a distributed coherent radar system. The bistatic radar system 100 depicts two radar RF front ends to simplify the description of relevant portions of the present invention and it is to be understood that the principles described for the two depicted radar RF front ends are applicable to distributed coherent radar systems with any number of radar RF front ends.

The bistatic radar system 100 depicts a first radar RF front end 102 and a second radar RF front end 106. In general, the first radar RF front end 102 and the second radar RF front end 106 both simultaneously transmit and receive RF signals. In some examples, the receivers in multiple radar RF front ends receive signals transmitted by a number of other radar RF front ends that are part of the distributed coherent radar system. The bistatic radar system 100 depicts the first radar RF front end 102 receiving a bistatic signal 104 that is transmitted by the second radar RF front end 106 after it is reflected by a target 108.

The first radar RF front end 102 has a first chirp Phase Locked Loop (PLL) circuit 134 that operates to generate RF waveforms to be transmitted by the first radar RF front end 102. The RF waveforms transmitted by the first radar RF front end 102 are able to be received by one or more of the first radar RF front end 102, the second radar RF front end 106, other radar RF front ends (not shown), or any combination of these. The first chirp PLL circuit 134 generates an RF signal with an increasing RF frequency, known as a chirp RF signal, that is used for a frequency modulated continuous wave (FMCW) radar system. In further examples, other RF waveforms are able to be generated.

The first radar RF front end 102 has a mixer circuit 122 that receives a first local oscillator (LO) signal 136 from the first chirp PLL circuit 134. The first LO signal 136 is a chirped local oscillator waveform that is synchronized to and tracks the transmitted RF frequency generated by the first chirp PLL circuit 134. The mixer circuit 122 uses the first LO signal 136 to down convert received radio frequency (RF) signals, such as bistatic signal 104, received by the receive antenna 120 so as provide a conditioned down-converted received baseband signal 123 to condition the received signal for digitization by the Analog-to-Digital Converter circuit (ADC) 124. This operation of the mixer circuit 122 is an example of a mixer circuit configured to down convert received radio frequency signals based on the chirped local oscillator waveform to create a down-converted baseband signal. The ADC 124 in the illustrated example is an example of a digitizer circuit and provides produces digital time samples 170 to a receive processing circuit 128. The receive processing circuit 128 depicts an example of a receive processing signal processing component and includes components that are contained within an example of a received signal processing circuit that, in an example, processes the digital time samples 170 to perform radar functions as well as to perform at least some of the frequency reference offset estimation processing that is described below. The digital time samples 170 are an example of time sample vectors that are processed by the receive processing circuit 128.

The first radar RF front end 102 includes a first digital hardware (HW) circuit 110 that includes a first timing engine circuit 132. The first timing engine circuit 132 generates timing signals to control, for example, a start of a generated RF chirp by the first chirp PLL circuit 134 and a start of data acquisition by the ADC 124 for each chirp waveform. The first radar RF front end 102 generates an acquisition start signal 112 to control the start of digitization of received baseband waveforms as produced by the mixer circuit 122 to allow the synchronization of the capture of received chirp RF waveforms by the ADC 124 with the start of the transmission of those chirp RF waveforms by the first chirp PLL circuit 134 as is controlled by a chirp start signal also produced by the first timing engine circuit 132. In general, the transmit and receive timing of all RF front ends of a distributed coherent radar system are synchronized such that the start of digitization by the ADC 124 based on the acquisition start signal 112 is coherent with the transmission of the RF chirp waveforms transmitted by all of the RF front ends of the distributed coherent radar system.

The first radar RF front end 102 receives a first frequency reference signal 130 from a first frequency reference circuit 126. The first frequency reference circuit 126 in the illustrated example produces a first frequency reference signal 130 that has a frequency of $f_1$. The first digital HW circuit 110, the first chirp PLL circuit 134, and the ADC 124 each receives the first frequency reference signal 130 to control the timing of their operations. Because the first digital HW circuit 110, first chirp PLL circuit 134 and the ADC 124 receive a common frequency reference signal, i.e., the first frequency reference signal 130 generated by the first frequency reference circuit 126, the operations of those components will remain synchronized regardless of changes in the frequency of the first frequency reference signal 130.

The second radar RF front end 106 has components similar to those described above for the first radar RF front end 102 that operate in a similar manner as those components described above. The components of the second radar RF front end 106 that are relevant to the present description include a second chirp PLL circuit 162, a second radar RF front end transmitting antenna 160, and a second digital HW circuit 154. The second radar RF front end 106 receives a second frequency reference signal 150 from a second frequency reference circuit 166. The second frequency reference signal 150 is received by the second chirp PLL circuit 162 and the second digital HW circuit 154 to control the timing of their operations in a manner similar to that described above with regards to the first digital HW circuit 110 and the first frequency reference signal 130. As is similar to the above described operation of the first timing engine circuit 132, the second timing engine circuit 152 generates an acquisition start signal and a chirp start signal 114 to control the start of received chirp digitization and transmitted chirp generation, respectively.

The second digital HW circuit 154 generates timing signals to control, among other things, the start of transmitted RF chirps generated by the second chirp PLL circuit 162. As described above with regards to the first radar RF front end, because the second digital HW circuit 154, and the second chirp PLL circuit 162 receive a common frequency reference signal, i.e., the second frequency reference signal 150 generated by the second frequency reference circuit 166, the operations of those components will remain synchronized regardless of changes in the frequency of the second frequency reference signal 150.

Although the circuits in the first radar RF front end 102 are all controlled by the first frequency reference signal 130 and the circuits in the second radar RF front end 106 are all controlled by the second frequency reference signal 150, the components of the first radar RF front end 102 and the second radar RF front end 106 receive frequency reference signals from different sources, i.e., the first frequency reference circuit 126 and the second frequency reference circuit 166, respectively, and thus may have different frequencies. The difference in frequencies between the first frequency reference signal 130 and the second frequency reference signal 150 is referred to herein as a frequency offset and is able to affect the accuracy of bistatic processing where, for example, processing by the receiver of the first radar RF front end 102 of received signals is not synchronized with the generation and transmission of those signal by different RF radar front ends, such as by the second chirp PLL circuit 162 within the second radar RF front end 106.

The bistatic radar system 100 depicts that the first frequency reference signal 130 has a frequency of $f_1$ and the second frequency reference signal 150 has a frequency of $f_2$. The frequency offset of these two signals is defined as Δ such that the frequency reference signals have the relationship:

$$f_2 = f_1 + \Delta$$

The below described systems and methods operate to process received signals to determine the value of Δ, i.e., the frequency offset between the receiver and transmitter of a particular signal, in order to improve the coherency between the receiver that received the signal and the transmitter that transmitted that signal. In some examples, a determined frequency offset A is able to be used to, e.g., adjust a frequency of the frequency reference of the receiver, perform compensation adjustments on the digital time samples 170 produced by the ADC 124 to compensate for the frequency offset, perform other adjustments, or any combination of these.

The bistatic radar system 100 depicts a monostatic operation for the first radar RF front end 102. A second target 144 is shown as reflecting a monostatic signal 142 transmitted by the first transmit antenna 140 of the first radar RF front end 102. The monostatic signal 142 is received by the first receive antenna 120 and processed by circuitry within the first radar RF front end 102 and the receive processing circuit 128.

Figure 2:
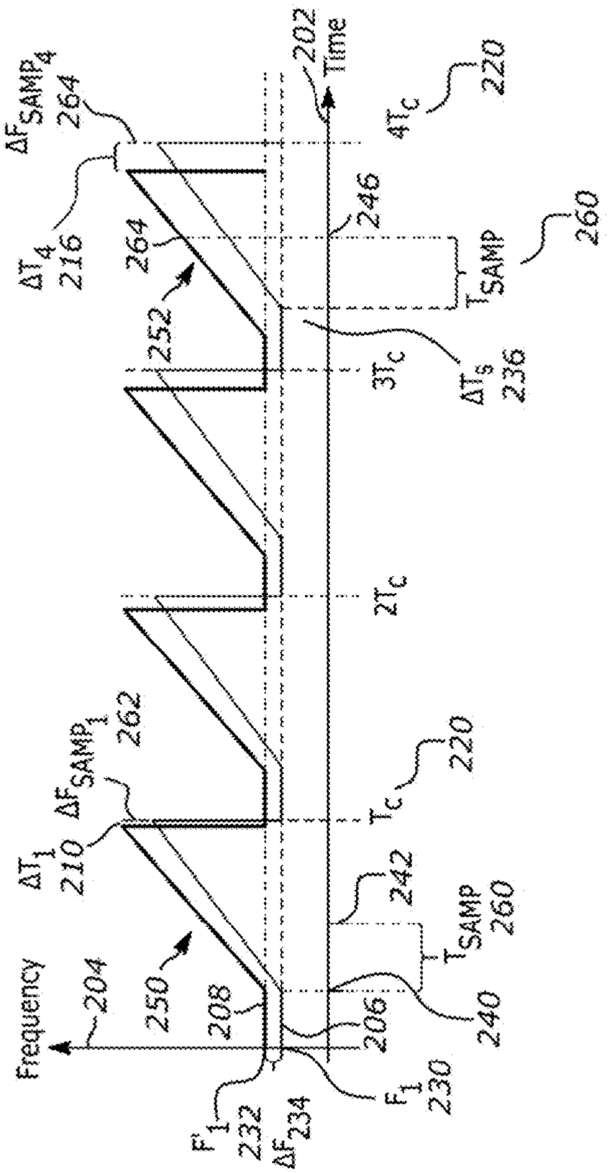
FIG. 2 illustrates a transmit and receive chirp frequency ramp sequence, according to an example.

FIG. 2 illustrates a transmit and receive chirp frequency ramp sequence 200, according to an example. The transmit and receive chirp frequency ramp sequence 200 depicts values of transmitted frequencies versus time 206 and received center frequencies versus time 208 for four (4) chirp periods that are a portion of a larger chirp sequence. The illustrated values of transmitted frequencies versus time 206 and received center frequencies versus time 208 illustrate effects of a frequency offset between the references of the transmitter and receiver. With references to the bistatic radar system 100, the second radar RF front end 106 transmits a signal with the illustrated transmitted frequencies versus time 206 and the receiver of the first radar RF front end 102 is configured to receive signals with a center frequency that is depicted by the received center frequencies versus time 208. The received center frequencies versus time 208 in the illustrated example is determined based on the first LO signal 136.

The transmit and receive chirp frequency ramp sequence 200 has a time axis 202 and a frequency axis 204. The frequency axis 204 is shown to extend over four (4) chirp periods. The illustrated chirp sequence of four (4) chirp periods is an example of a portion of a longer chirp sequence that is able to have any suitable number of chirp periods. In an example, a distributed coherent radar system is able use chirp sequences that contain one hundred and twenty eight (128) chirp periods.

The receive center frequencies versus time 208 depicts the center frequency to which the receiver is tuned. With reference to the above described first radar RF front end 102, the mixer circuit 122 of the receiver receives a first local oscillator signal 136 from the first chirp PLL circuit 134 so that the receiver tracks the RF chirp broadcast by the transmitter of that radar RF front end. The down-converted received baseband signal 123 contains a range of frequency components around the receive center frequency that are digitized by the ADC 124 and the receive processing circuit 128.

The transmitted frequencies versus time 206 starts at time equals zero (0) with frequency $F_1$ 230 but due to the frequency offset between the first frequency reference circuit 126 that controls the receiver frequencies and the second frequency reference circuit 166 that controls the transmitter frequencies, the received center frequencies versus time 208 starts in the illustrated example at time equals zero (0) with frequency $F'_1$ 232, which differs from the transmitter's frequency $F_1$ 230 by RF frequency difference $\Delta F$ 234. The RF frequency difference $\Delta F$ 234 is due to the frequency offset between the frequency reference signals controlling the operations of the transmitter and receiver. In the illustrated example, the respective frequency reference signals are provided to the chirp PLL of the receiver and transmitter, e.g., the first chirp PLL circuit 134 and the second chirp PLL circuit 162, respectively, and the processing within each chirp PLL generates an RF frequency that is either transmitted or used to control the center frequency of the receiver of the same radar RF front end.

The frequency offset between the frequency references of the transmitter and receiver in the illustrated example further causes a drift in the synchronization between the timing engines in the two digital HW circuits. As described above, the timing engines determine a start time and time duration of time periods over which the chirp PLL transmits an RF waveform, and a start time and time duration over which the ADC of the receiver captures received baseband signals.

The transmit and receive chirp frequency ramp sequence 200 depicts a growing difference between the start times and end times of each chirp period for the transmitted and received center frequencies. For example, the first frequency chirp 250 for the transmitted frequency versus time 206 starts at time $T_0$ 240 and ends at $T_C$ 220. The first chirp for the received center frequencies versus time 208 in the illustrated example also starts at $T_0$ 240 but ends earlier by a time difference of $\Delta T_1$ 210. This shorter chirp time for the receiver also results in a faster chirp rate, i.e., the rate at which the received RF frequency increases during the chirp period. The difference in the frequency slope of the transmitted waveform and the receiver's chirp generator controlling the receipt and digitization of the received waveform during a chirp period is referred to a chirp frequency offset.

The fourth frequency chirp 252 is shown to have a transmitter start time of $3T_C$ 224 but the receiver has started that chirp ramp $\Delta T_s$ 236 earlier. The transmitter also ends the fourth frequency chirp $\Delta T_4$ 214 later than the receiver. As shown for the transmit and receive chirp frequency ramp sequence 200, the chirps between the first frequency chirp 250 and the fourth frequency chirp 252 have start time differences and end time differences that progressively grow with each chirp period.

The transmit and receive chirp frequency ramp sequence 200 further shows a sample time $T_{Samp}$ 260 that occurs within the first frequency chirp 250 and the fourth frequency chirp 252. The sample time $T_{Samp}$ 260 in this illustrated example indicates an arbitrary time point within the frequency chirp periods to illustrate the effect of the frequency offsets as time progresses through a chirp sequence.

A receiver without a frequency offset would have the receiver center frequency that is the same as the transmitted frequency. The frequency error of the received center frequencies versus time 208 relative to the transmitted frequencies versus time 206 at the $T_{Samp}$ 260 point of the first frequency chirp 250 is shown as $\Delta F_{Sample1}$ 262. The frequency error $\Delta F_{Samp1}$ 262 in an example causes an offset in the received frequency that appears as a frequency shift of received signals in a down-converted baseband received signal 123 that is produced by the mixer circuit 122 of the first radar RF front end 102. This frequency error is reflected as an error is the determined distance to the target reflecting that signal.

The frequency error of the received center frequencies versus time 208 relative to the transmitted frequencies versus time 206 at the $T_{samp}$ 260 point of the fourth frequency chirp 252 is shown as $\Delta F_{Samp2}$ 264. The $\Delta F_{Samp2}$ 264 is larger than the $\Delta F_{Samp1}$ 262 that exists at the at the $T_{Samp}$ 260 point of the first frequency chirp 250. The increase in the value of $\Delta F_{Samp2}$ 264 over to the $\Delta F_{Samp1}$ 262 is due to the increasing drift between the chirp frequencies over multiple chirp periods and is referred to as chirp center frequency drift. In general, for the illustrated example, the frequency error between the receiver and transmitter grows linearly over time during chirp sequences.

Figure 3:
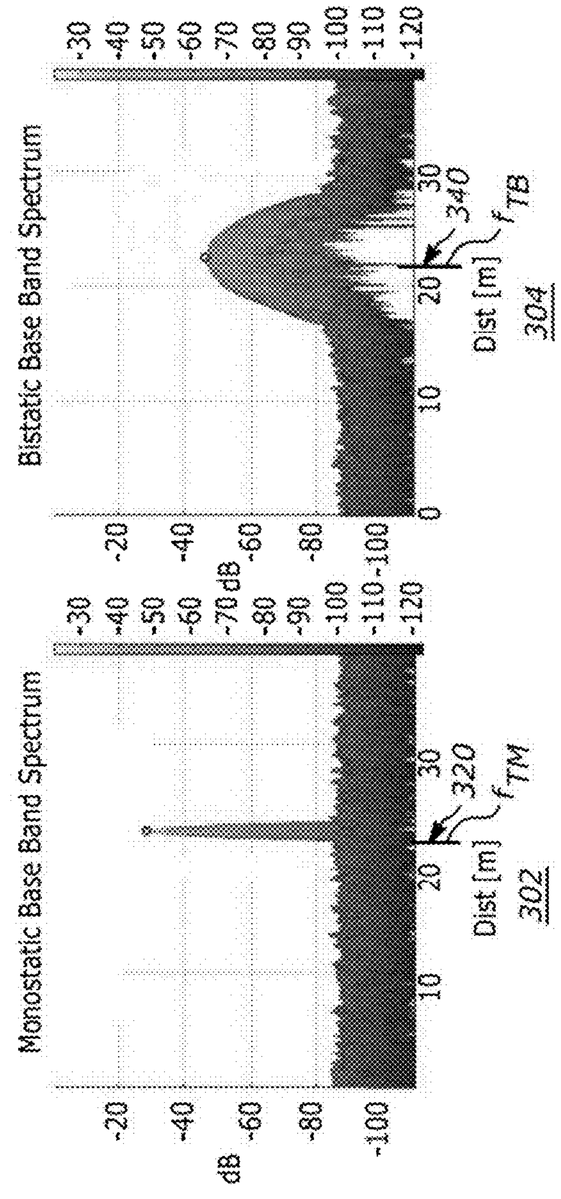
FIG. 3 illustrates a received baseband spectrum comparison, according to an example.

FIG. 3 illustrates a received baseband spectrum comparison 300, according to an example. The received baseband spectrum comparison 300 depicts two received baseband spectra that illustrate the results of a frequency offset between the frequency references of two radar RF front ends. With reference to the bistatic radar system 100, the monostatic baseband spectrum 302 represents an example spectrum determined by processing the data produced by the ADC 124 of the first radar RF front end 102 when receiving a monostatic signal 142 of a chirp signal generated by the first chirp PLL circuit 134 and that is transmitted by the first radar RF front end transmit antenna 140 and reflected by the second target 144. Because the components of the first radar RF front end all have their time and frequency processing controlled by a single frequency reference signal, i.e., the first frequency reference signal 130, the transmitter and receiver maintain coherence and thus the received monostatic baseband spectrum 302 has a narrow bandwidth peak at a monostatic target frequency $F_{tm}$ 320 that corresponds to the distance to the second target 144 as indicated by processing a received frequency modulated continuous wave (FMCW) chirp radar waveform.

With further reference to the bistatic radar system 100, the bistatic baseband spectrum 304 represents an example spectrum determined by processing the data produced by the ADC 124 of the first radar RF front end 102 when receiving a bistatic signal 104 of a chirp signal generated by the second chirp PLL circuit 162 and transmitted by the second radar RF front end transmitting antenna 160. Because the components of the first radar RF front end 102 and the components of the second radar RF front end 106 have their time and frequency processing controlled by different frequency reference signals, i.e., the first frequency reference signal 130 and the second frequency reference signal 150, the transmitter and receiver are less synchronized due to the frequency offset of those two frequency reference signals The received bistatic baseband spectrum 304 has a peak at a bistatic target frequency $F_{tb}$ 340 that corresponds to the distance to the target 108 as indicated by processing a received frequency modulated continuous wave (FMCW) chirp radar waveform but is also offset from a true distance due to the frequency offset between the frequency reference signals of the transmitter and receiver. The increased spectral width of the peak in the received bistatic baseband spectrum 304 relative to the monostatic baseband spectrum 302 is due to the difference in RF signal frequency between the transmitted signal and the received center frequency due to the different frequency ramp rates during the chirp period as shown in the transmit and receive chirp frequency ramp sequence 200. These different ramp rates cause the RF frequency between the transmitter and the received signal center frequency to change over each ramp period, and the frequency difference also increases from chirp period to chirp period over a sequence of chirps.

Figure 4:
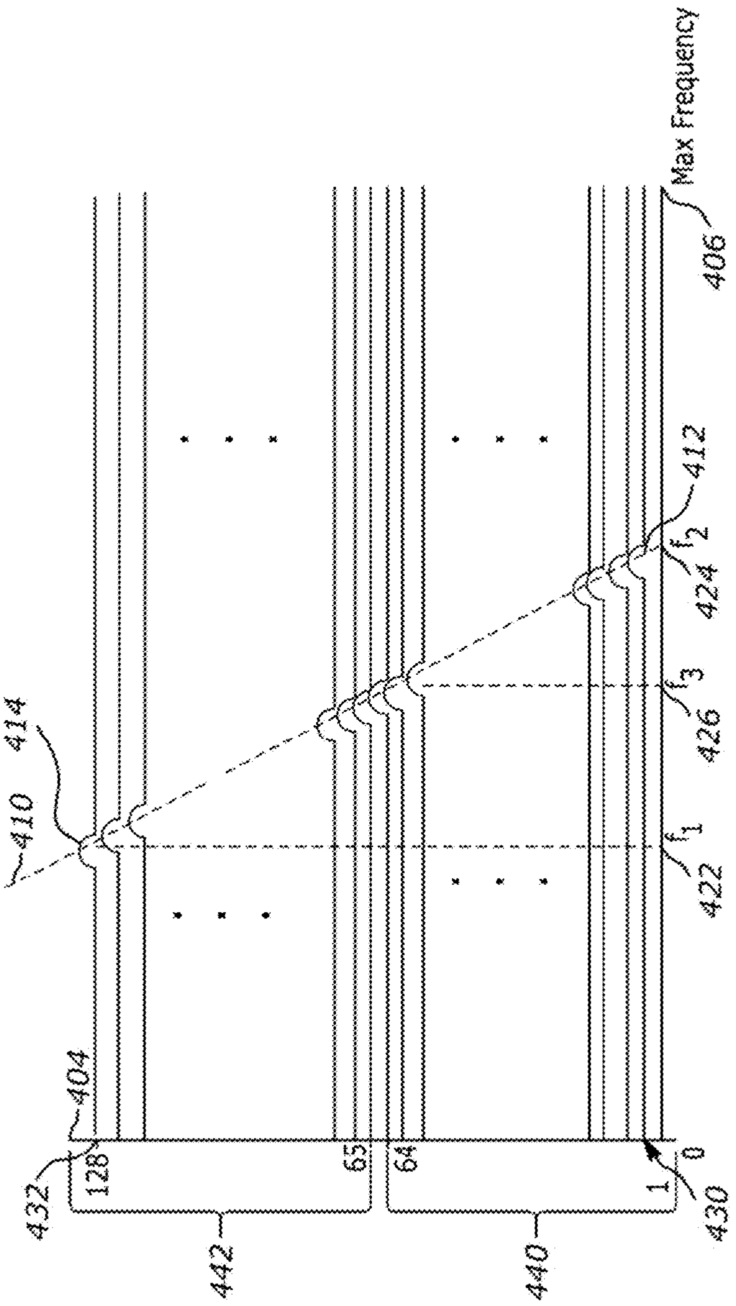
FIG. 4 illustrates a received chirp sequence baseband frequency spectrum waterfall chart, according to an example.

FIG. 4 illustrates a received chirp sequence baseband frequency spectrum waterfall chart 400, according to an example. The received chirp sequence baseband frequency spectrum waterfall chart 400 depicts the baseband frequency spectrum of a number of received chirps in a chirp sequence. The received chirp sequence baseband frequency spectrum waterfall chart 400 has a frequency axis 402 along its horizontal axis that extends from zero to a maximum chirp frequency component 406. The vertical axis of the received chirp sequence baseband frequency spectrum waterfall chart 400 is a sequence number axis 404 that reflects the sequential number of each chirp in the chirp sequence that is displayed.

In the example described above with regards to the bistatic radar system 100, the baseband frequency data is calculated by digitizing the down-converted received baseband signal 123 signal and accumulating digitized baseband data produced by the ADC 124 for each chirp in a number of chirps within a chirp sequence. The processing in an example is performed by the receive processing circuit 128 that separately calculates a Fast Fourier Transform (FFT) of the baseband time domain data that was captured and digitized for each received chirp. The baseband frequency spectrum data is then stored for each chirp in an accumulated set of chirp periods in a chirp sequence. The received chirp sequence baseband frequency spectrum waterfall chart 400 depicts baseband frequency spectrum data for a sequence of one hundred and twenty eight (128) successive chirp periods. The frequency spectrum data for each chirp is sequentially displayed above its preceding trace with sequence numbers for the displayed chirps increasing along the vertical sequence number axis 404.

As is understood by practitioners of ordinary skill in the relevant arts, the operation of a continuous wave frequency modulation chirp radar results in signals reflected back to a receiver by a target having a frequency in the baseband frequency spectrum that is related to the distance that the received signal traveled from its transmitter to the receiver when that signal is reflected by a target. In the illustrated example, to simplify the description of relevant aspects of this example, the baseband frequency data depicts one respective spectral peak in the baseband frequency spectrum of each chirp period, where that spectral peak reflects the distance the chirped signal traveled from the transmitter to the receiver, which indicates a distance to the target that reflected that signal. In the illustrated example, movement of the target is assumed to be inconsequential to the described processing and thus without a frequency offset between the reference oscillator of the transmitter and receiver, the spectral peak for all received chirps in the received chirp sequence baseband frequency spectrum waterfall chart 400 should occur at the same baseband frequency.

The frequency of the spectral peaks of the baseband frequency data of successive chirp periods shows a frequency shift for each successive chirp. The frequency of the spectral peak of successive chirp periods in the illustrated example lies along a frequency spectrum peak movement line 410. The frequency spectrum peak movement line 410 indicates that the frequency of the spectral peak of each received chirp baseband spectrum shifts over time during the reception of the depicted chirp sequence. The received chirp sequence baseband frequency spectrum waterfall chart 400 indicates that the first chirp 430 of the chirp sequence has a first baseband spectral peak 412 at $f_2$ 424. The last chirp 432 of the chirp sequence has a second baseband spectral peak 414 at frequency $f_1$ 422. The received chirp sequence baseband frequency spectrum waterfall chart 400, and the frequency spectrum peak movement line 410, depicts the RF frequency shift as described above with regards to the transmit and receive chirp frequency ramp sequence 200 as depicted by the $\Delta F_{samp1}$ 262 and the $\Delta F_{Samp2}$ 264.

As discussed above, the shift of the spectral peak of successive chirp periods is due to a difference in RF frequency of the transmitted bistatic signal 104 as generated by the second chirp PLL circuit 162 that transmitted the chirp sequence and the receive center frequency as is controlled by the first LO signal 136. The presently described systems and methods analyze the frequency shift of spectral peaks in received chirp sequences to estimate the frequency offset between the frequency references of the transmitter and receiver processing the received signal. This estimated frequency offset can be used to improve bistatic radar processing such as by compensating received data by, for example, adjusting the received data to compensate for the frequency reference offset. In some examples, such compensation is able to include adjusting for frequency shifts in the received data that are caused by the estimated frequency reference offsets, adjusting a sample rate of an analog-to-digital converter such as the ADC 124, performing other adjustments, or combinations of these.

The received chirp sequence baseband frequency spectrum waterfall chart 400 depicts frequency spectrum data for a sequential set of one hundred and twenty-eight (128) chirps. In an example, the received chirp sequence baseband frequency spectrum waterfall chart 400 depicts data that is stored in a frequency spectrum data storage such as is described in further detail below. A frequency spectrum data storage in an example stores frequency spectrum data for a number of sequentially received chirp periods. The data stored in such a frequency spectrum data storage is able to be used to support processing to determine a range and velocity of a target that reflects a received signal within a distributed coherent radar system, including such a system that transmits and processes received frequency modulated continuous wave (FMCW) signals.

The illustrated received chirp sequence baseband frequency spectrum waterfall chart 400 depicts one hundred and twenty-eight (128) chirp periods that are divided into two durations, a first duration 440 and a second duration 442. As shown, the first duration 440 includes chirp number 1 through chirp number 64, and the second duration 442 includes chirp number 65 through chirp number 128. The illustrated first duration 440 and the second duration 442 thus have frequency spectrum data for an equal number of chirps where each duration has half of the total number of chirps. As is described in further detail below, processing to determine an estimated frequency offset between frequency references processes frequency spectrum data by selecting pairs of sets of frequency spectrum data where one set of frequency spectrum data in that pair is selected from the first duration 440 and the other set of frequency spectrum data in that pair is selected from the second duration 442. In an example, based on the illustrated one hundred and twenty-eight (128) chirps, this processing uses frequency spectrum data for sixty-four (64) chirp periods that are separated by sixty-four (64) chirp periods. For example, processing to determine a frequency offset between the frequency reference of the transmitter and receiver is able to process one pair of frequency spectrum data that includes chirp periods 1 and 65, another pair of frequency spectrum data that includes chirp periods 2 and 66, and so forth.

Figure 5:
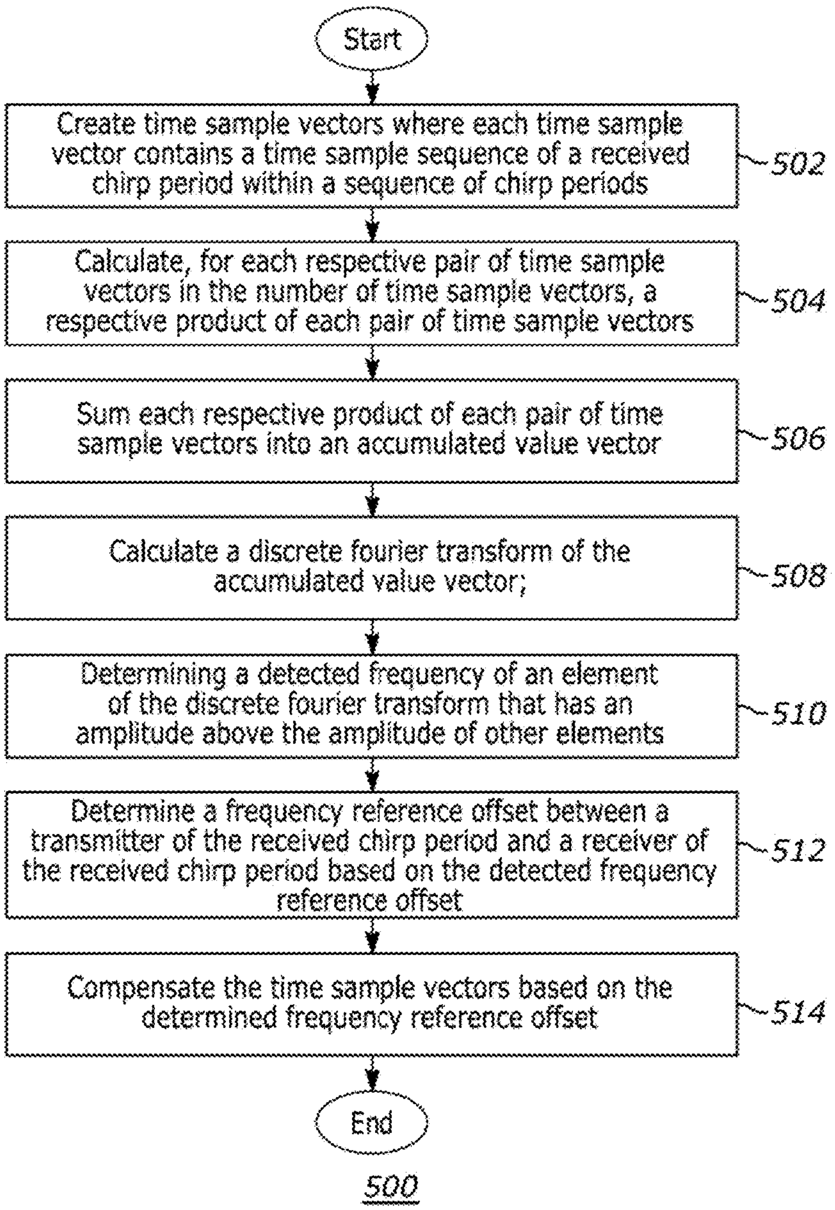
FIG. 5 illustrates a frequency reference offset determination process, according to an example.

FIG. 5 illustrates a frequency reference offset determination process 500, according to an example. The frequency reference offset determination process 500 is an example of a process performed by, for example, the above described receive processing circuit 128 to determine frequency offset values between the frequency reference of a transmitter, such as the second frequency reference circuit 166 of the bistatic radar system 100, and the frequency reference of the receiver, such as the first frequency reference circuit 126 of the bistatic radar system 100.

The frequency reference offset determination process 500 creates, at 502, time sample vectors where each time sample vector contains a time sample sequence of a received chirp period within a sequence of chirp periods. Such a number of time sample vectors are created in an example by the above described Analog to Digital Converter circuit (ADC) 124 digitizing received baseband data over a number of chirp cycles under the timing control of the acquisition start signal 112. In an example, the acquisition start signal 112 causes the ADC 124 to digitize one chirp period in order to create one time sample vector that contains time samples for that chirp period and continues to do so for each chirp period a sequence of chirp periods such as are described for the transmit and receive chirp frequency ramp sequence 200. In an example, as is described in further detail below, each time sample vector is able to be converted into a frequency domain sample vector such as by a Fast Fourier Transform (FFT) where that frequency domain sample vector is stored for further processing.

In an example, a respective product of each pair of time sample vectors is calculated, at 504, for each respective pair of time sample vectors in the number of time sample vectors. This product is defined as an element by element multiplication of the time domain samples within the two time sample vectors and produces a vector with a number of elements equal to the number of elements in each of the two time sample vectors. This sample by sample multiplication of time domain elements of the pair of time sample vectors is equivalent to calculating a frequency domain convolution of the waveforms represented in those vectors. In an example, as is described below, these time sample vectors are able to be obtained by performing an inverse Discrete Fourier Transform (DFT), such as by an inverse FFT, of stored frequency domain sample data.

The values obtained by each respective product of each pair of time sample vectors is summed into an accumulated value vector, at 506. The accumulated value vector has a number of elements equal to the number of elements of each of the time sample vectors. A Discrete Fourier Transform of the accumulated value vector is calculated, at 508. This Discrete Fourier Transform in an example is calculated as a Fast Fourier Transform (FFT) and contains frequency components of the sum of the cross-correlation values equivalently calculated by the above described product of pairs of time sample vectors.

A detected frequency of the Discrete Fourier Transform vector of the above accumulated value vector that has an amplitude above the amplitude of other elements in the Discrete Fourier Transform vector is determined, at 510. In an example, each amplitude value in the accumulated value vector is examined to find an element with an amplitude value that is above other elements. In some examples, an element with a maximum absolute value amplitude in the Discrete Fourier Transform vector is determined. In some examples, the detected frequency is determined based on a frequency corresponding to an element of the Discrete Fourier Transform that has an amplitude higher than other elements of the Discrete Fourier Transform.

A frequency reference offset between a transmitter of the received chirp period and a receiver of the received chirp period is determined based on the detected frequency, at 512. The relationship between the detected frequency within the Discrete Fourier Transform of the accumulated value vector and the value of the frequency offset between the frequency references of the transmitter and receiver is able to be determined based on the chirp sequence parameters as is described below. In an example, the frequency offset is determined between a transmitter of the received chirp period and a frequency of a frequency reference signal driving a mixer circuit of the receiver receiving the received chirp period.

The time sample vectors are compensated, at 514, based on the determined frequency reference offset. An example of compensating time sample vectors is described below wherein compensation of the time sample vectors include compensation by determining compensation vectors to be applied to the time sample vectors to compensate for a determined carrier frequency offset and chirp frequency slope offset, and a compensation matrix is determined to compensate the time sample vectors for chirp center frequency drift offset.

Figure 6:
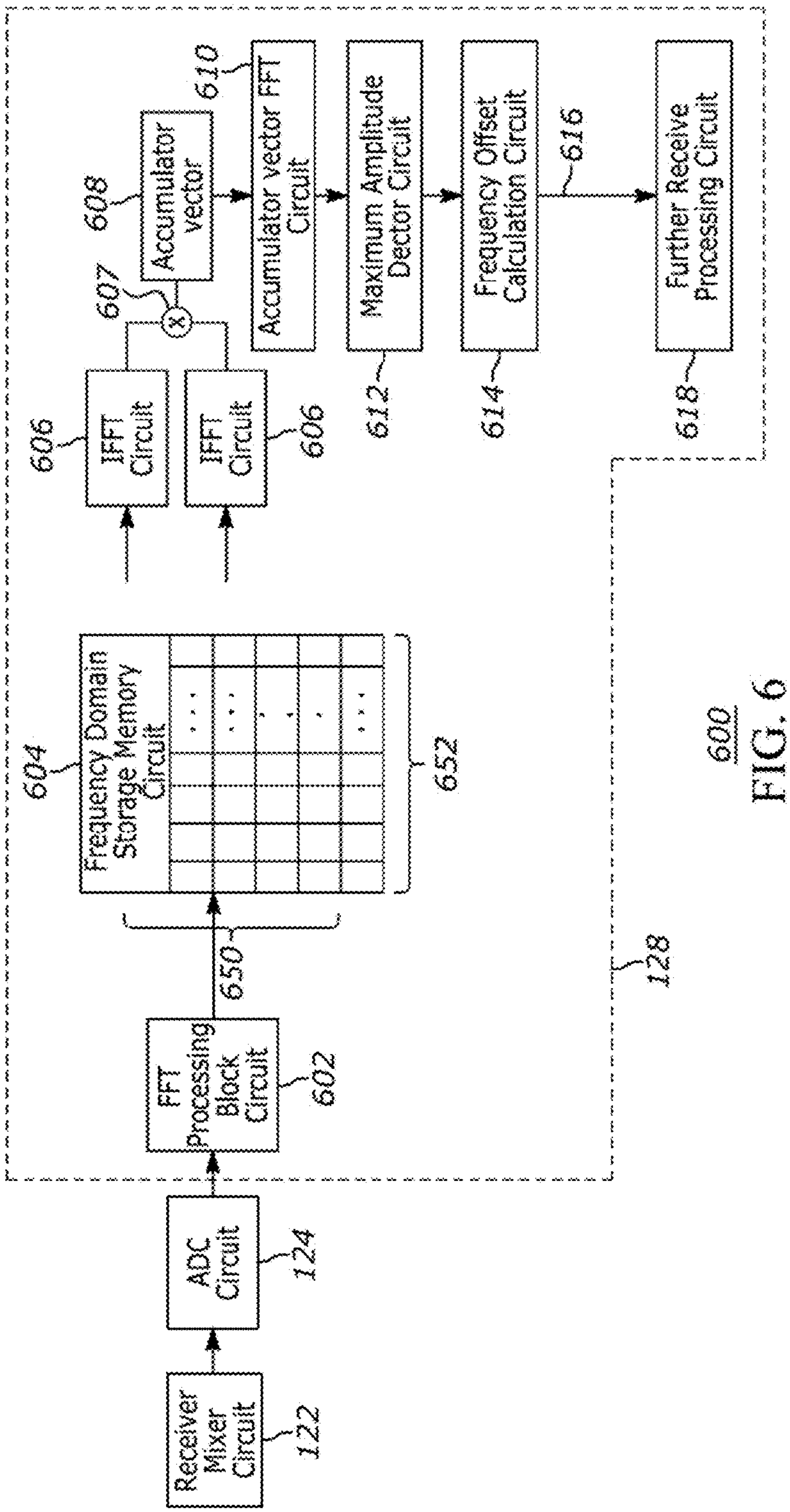
FIG. 6 illustrates a memory efficient chirp sequence processing block diagram, according to an example.

FIG. 6 illustrates a memory efficient chirp sequence processing block diagram 600, according to an example. The memory efficient chirp sequence processing block diagram 600 depicts components that are included in an example of the above described receive processing circuit 128. The memory efficient chirp sequence processing block diagram 600 depicts an example of the presently described systems and methods that is suited to support, for example, processing by a FMCW radar system that processes received frequency spectrum data of a number of chirp periods in order to determine the distance to and also the velocity of targets reflecting the FMCW signal. The memory efficient chirp sequence processing block diagram 600 depicts processing components that advantageously minimizes data storage by utilize the already stored array of frequency domain data for a number of chirp periods to determine frequency reference offsets between transmitters and receivers.

The illustrated example of the memory efficient chirp sequence processing block diagram 600 includes the above described mixer circuit 122 and Analog to Digital Converter (ADC) 124. The ADC 124 generates a digitized data stream that consists of digital time samples 170 of a baseband signal representing a one chirp period of a received waveform, such as is depicted by the received center frequencies versus time 208 portion of a depicted in the transmit and receive chirp frequency ramp sequence 200. In an example, as is described above with regards to the bistatic radar system 100, timing of the operations of the ADC 124 is synchronized to the chirp waveform transmission so that time domain sample vectors are created for each individual chirp period. In the illustrated example, the ADC 124 produces a constant number of samples during each chirp period of the received baseband signal.

The memory efficient chirp sequence processing block diagram 600 depicts a number of processing and storage elements that are included in an example of the above described receive processing circuit 128. In further examples, the receive processing circuit 128 is able to include any suitable processing components. In some examples, elements depicted for the receive processing circuit 128 are performed by a configurable or programmable processor such that one or more of the depicted elements that perform operations are able to be implemented by a single processor. These processing and storage elements of the illustrated memory efficient chirp sequence processing block diagram 600 are described below.

The receive processing circuit 128 depicted for the illustrated memory efficient chirp sequence processing block diagram 600 has a Fast Fourier Transform (FFT) processing block circuit 602 that receives the time sample sequence data stream produced by the ADC 124. In an example, the FFT processing block circuit 602 accumulates time sample data for one chirp period and performs an FFT to produce frequency spectrum data for one received chirp period. The FFT processing block circuit 602 produces a set number of frequency domain samples for each chirp period where that number of samples is an integer power of two.

The illustrated receive processing circuit 128 includes a frequency domain storage memory circuit 604 that stores the frequency spectrum data produced by the FFT processing block circuit 602. The frequency domain storage memory circuit 604 is an example of a Fourier Transform storage. The illustrated example depicts the frequency domain storage memory circuit 604 as memory arranged in a two-dimensional array with a row count 650 and a column count 652. The frequency domain storage memory circuit 604 in an example stores frequency domain data for each single chirp period of a row count 650 number of chirp periods in a separate row within the row count 650. Each row of the frequency domain storage memory circuit 604 has column count 652 elements that correspond to the number of FFT bins produced by the FFT processing block circuit 602. In an example, successively received chirp periods are stored in successive rows of the frequency domain storage memory circuit 604 in the order in which they were received. The data stored in the frequency domain storage memory circuit 604 is similar to the data illustrated in the above discussed received chirp sequence baseband frequency spectrum waterfall chart 400. In some examples, the frequency domain storage memory circuit 604 is able to store one hundred and twenty-eight (128) rows of frequency domain data, i.e., frequency domain data for one hundred and twenty-eight (128) chirp periods.

The memory efficient chirp sequence processing block diagram 600 depicts two Inverse Fast Fourier Transform (IFFT) circuit blocks 606. Each of these IFFT circuit blocks 606 reads a respective row of frequency spectrum data vectors from the frequency domain storage memory circuit 604 and performs an Inverse Fast Fourier Transform on that data to reproduce the time domain sample vectors of the signal received during a chirp period. In some examples, these two IFFT circuit blocks 606 are able to be implemented as one processing block that sequentially processes each of the two frequency spectrum data vectors.

In some examples, the pairs of the chirp periods in an example that are processed by the IFFT circuit blocks 606 are selected from the frequency domain storage memory circuit 604 such that one of the frequency spectrum data vectors is selected from a first half of the row count 650 of rows of the frequency domain storage memory circuit 604 and the other frequency spectrum data vector is selected from the second half of the row count 650 of the frequency domain storage memory circuit 604, where the selected frequency spectrum data vectors are separated by a fixed number of rows. In an example where row count 650 is equal to "K," a total of K/2 chirp period pairs are processed. In that example, the frequency domain vectors of the pairs of frequency domain vectors that are selected and processed are separated by K/2 rows in the frequency domain storage memory circuit 604 and are thus separated by K/2 chirp periods.

A multiplier circuit 607 in the illustrated example multiplies each element in one of the time domain sample vectors produced by one of the IFFT circuit blocks 606 by a corresponding element in the other time domain vector produced by the other IFFT circuit block 606 to create an accumulator vector 608. An example of such a multiplication is multiplying the first element of each time domain sample vector to obtain a first element of the accumulator vector, multiplying the second element of each time domain sample vector to obtain the second element of the accumulator vector, and so forth. This is an example of multiplying corresponding elements of each respective pair of inverse Discrete Fourier Transform vectors. The accumulator vector 608 contains the same number of elements as the time domain vectors produced by the two IFFT circuit blocks 606 where each element of the accumulator vector 608 is a product of the elements in the same position of the two time domain vectors. The operation of the multiplier circuit 607 and accumulator vector 608 by processing IFFTs produced from two frequency domain vectors stored in the frequency domain storage memory circuit 604 is equivalent to performing a frequency domain convolution of those frequency domain vectors.

In an example, the processing to perform IFFT for pairs of frequency domain vectors stored in the frequency domain storage memory circuit 604 occurs after the frequency domain storage memory circuit 604 has stored its total number of frequency domain vectors, at which time new data is not added to the frequency domain storage memory circuit 604 until the multiply and accumulation operations for the time domain vectors produced by the IFFT circuit blocks 606 have processed each stored pair of frequency domain vectors contained in the frequency domain storage memory circuit 604. In an example, such processing is performed during periods between transmission of chirp sequences.

After the accumulator vector 608 has been created by accumulating the products of pairs of time domain vectors of each chirp period as produced by the IFFT circuit blocks 606, an accumulator vector FFT circuit processing block 610 performs an FFT of the samples in the accumulator vector 608. This produces an FFT vector containing frequency components of the data stored in the accumulator vector 608.

A maximum amplitude detector circuit 612 processes the FFT vector produced by the accumulator vector FFT circuit processing block 610 to identify a frequency component that has a maximum amplitude or maximum absolute value. The frequency component with a maximum amplitude in that FFT vector is generated due to a frequency offset between the frequency reference of the transmitter of the received signal and the receiver processing that signal.

The frequency of the identified frequency component with the maximum amplitude is provided to a frequency offset calculation processor circuit 614. The frequency of this frequency component is related to the actual frequency offset between the frequency reference of the transmitter and receiver. In an example as is described above, where the row count 650 is equal to "K" and a total of K/2 chirp period pairs are sequentially processed with K/2 chirp periods between the pairs of frequency domain vectors, the frequency of the of the frequency offset between the frequency references of the transmitter and receiver is given by the following relationships:

$$\hat{\delta}_t = \frac{1}{\mu T_{sw}} * \delta_{f,drift} \text{ and}$$

$$\delta_{f,drift} = \frac{2}{KT_a} * \operatorname{argmax}\left\{\sum_{k=1}^{K/2} corr\{\hat{s}_k, \hat{s}_{k+K/2}\}\right\}$$

where:

$\hat{\delta}_t$ is the reference clock frequency offset between the transmitter and receiver;

K=number of chirp periods being processed;

$T_{sw}$=time duration of each chirp period;

μ=chirp ramp slope;

$\delta_{f,drift}$=chirp center frequency drift from chirp to chirp;

$T_a$=chirp acquisition or ADC sampling duration;

$\hat{s}_k$ is the frequency domain vector for chirp k;

$\hat{s}_{(k+K/2)}$ is the frequency domain vector for chirp (k+K/2); and argmax returns an index of a vector with a maximum magnitude.

The processing performed by the memory efficient chirp sequence processing block diagram 600 produces a result when processing a received signal containing K chirps is based on the above relationships. The frequency offset calculation processor circuit 614 determines a reference frequency offset value 616 based on the above relationship and provides the reference frequency offset value 616 to a further receive processing circuit 618. In various examples, the further receive processing circuit 618 is able to perform various processing as described above with regards to the above described receive processing circuit 128.

In some examples, the further receive processing circuit 618 processes time domain data to compensate the time sample vectors of the received chirp signals. In an example, such compensation is performed by the receive processing circuit on data samples as they are received from the ADC 124 based on the reference frequency offset value 616 according to the following compensation adjustments:

$$S_{corr}(t, k) = S_{rx}(t, k) * rot_{cfo}(t) * rot_{slope}(t) * rot_{drift}(t, k), \text{ where}$$

$$rot_{cfo}(t) = e^{-2\pi j \hat{\delta}_t f_{carr} t}$$

$$rot_{drift}(t, k) = e^{-2\pi j \mu \hat{\delta}_t k T_{sw} t}$$

$$rot_{slope}(t) = e^{-2\pi j \mu \hat{\delta}_t t^2}$$

Where in the above compensation adjustments, $S_{corr}$(t, k) is the corrected received samples of a chirp number k in a chirp sequence;

$S_{rx}$(t, k) is the received ADC samples of a chirp number k in a chirp sequence;

$f_{carr}$ is the chirp sequence carrier frequency;

$rot_{cfo}$(t) is a carrier frequency offset compensation vector used to compensate carrier frequency offset;

$rot_{slope}$(t) is a chirp frequency compensation vector used to compensate chirp frequency slope offset; and $rot_{drift}$(t, k) is a chirp center frequency drift compensation matrix used to compensate chirp center frequency drift across chirps.

Figure 7:
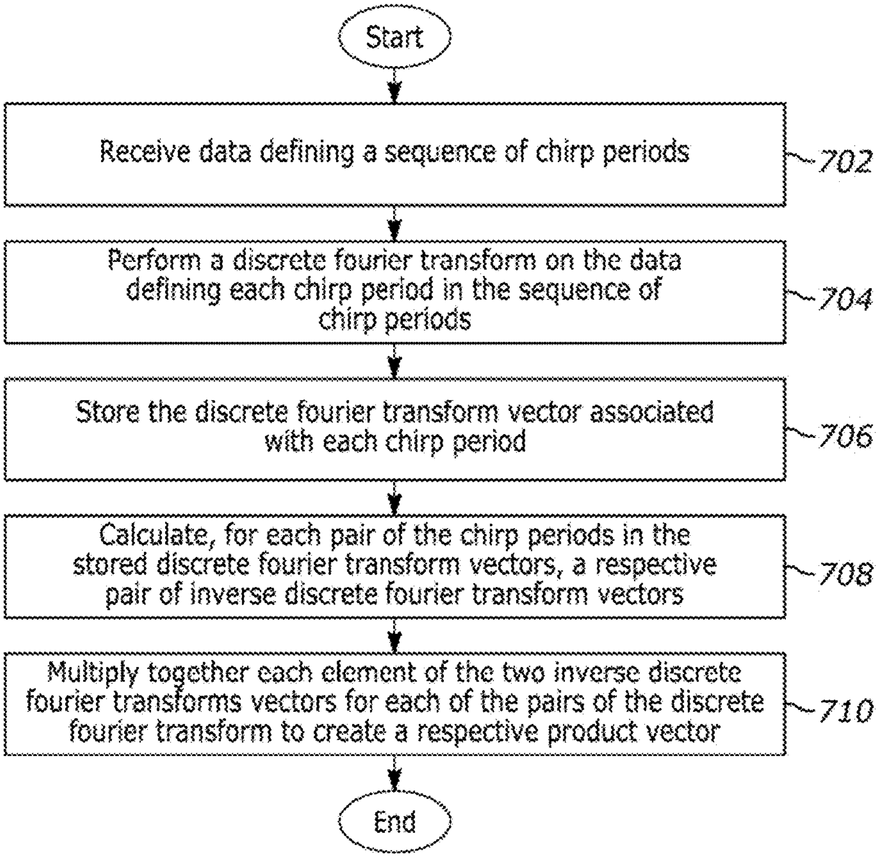
FIG. 7 illustrates a stored frequency spectrum frequency offset determination process, according to an example.

FIG. 7 illustrates a stored frequency spectrum frequency offset determination process 700, according to an example. The stored frequency spectrum frequency offset determination process 700 is an example of processing performed by a radar system incorporating the above described memory efficient chirp sequence processing block diagram 600. The stored frequency spectrum frequency offset determination process 700 includes an alternative process for performing the above described calculation of a respective product of each pair of time sample vectors for each respective pair of time sample vectors in the number of time sample vectors at 504 of the frequency reference offset determination process 500.

The stored frequency spectrum frequency offset determination process 700 receives, at 702, data defining a sequence of chirp periods. In an example, the received data defining a sequence of chirp periods consists of time domain samples that are produced by the ADC 124 and a separate time domain sample vector is received for each received chirp period within a sequence of chirp periods, as is described above for example, at 502, of the frequency reference offset determination process 500.

In an example, baseband data representing the received chirp periods are processed by a Discrete Fourier Transform (DFT), at 704 where the baseband data represents each chirp period in the sequence of chirp periods. In an example, the DFT is performed by the FFT processing block circuit 602 described above.

The Discrete Fourier Transform (DFT) vector associated with each chirp period is stored, at 706. In an example, the DFT is performed as a fast Fourier transform (FFT). In some examples, a frequency domain vector produced by the FFT for the received waveform for each of a row count 650 of chirp periods is sequentially stored in a separate row of the frequency domain storage memory circuit 604.

A respective pair of inverse Discrete Fourier Transform vectors for each pair of Discrete Fourier Transforms (DFTs) is calculated, at 708, for each pair of chirp periods in the stored Discrete Fourier Transforms. These inverse Discrete Fourier transforms in an example are performed as inverse FFTs by the above described IFFT blocks 606. In an example, the pairs of the chirp periods are selected from the frequency domain storage memory circuit 604 such that one of the DFT frequency domain vectors is selected from a first half of the row count 650 of rows of the frequency domain storage memory circuit 604 and the other DFT frequency domain vector is selected from the second half of the row count 650 of the frequency domain storage memory circuit 604. In an example, these respective pairs are chosen in sequence through one half of the row count 650 so that all rows are so processed.

Each element of the two inverse Discrete Fourier Transforms for each of the pairs of the Discrete Fourier Transform vectors are multiplied to create a respective product vector, at 710. This multiplication in an example is performed by the above described multiplier circuit 607. In an example, the product of the two inverse Discrete Fourier Transforms is an output of the above described calculation of a respective product of each pair of time sample vectors for each respective pair of time sample vectors in the number of time sample vectors at 504 of the frequency reference offset determination process 500. This product vector is provided as an input to the above described summing such product vectors into an accumulated value vector, such as the above described accumulator vector 608, at 506 of the frequency reference offset determination process 500. In such an example, the above described subsequent processing of the frequency reference offset determination process 500 continues.

Figure 8:
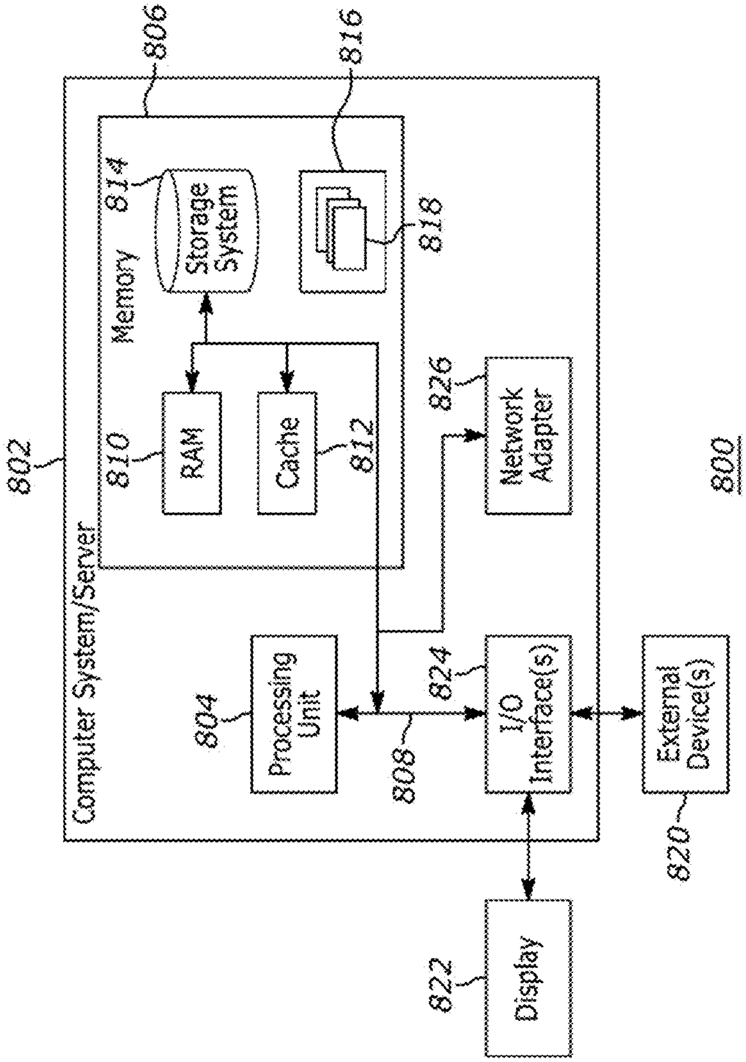
FIG. 8 is a diagram illustrating one example of an information processing system according to one embodiment of the present invention.

FIG. 8 is a block diagram illustrating an information processing system 800 that can be utilized by one or more examples discussed herein. The computer system/server 802 is based upon a suitably configured processing system configured to implement one or more examples of the present invention, such as elements of the above described bistatic radar system 100. Any suitably configured processing system, including specialized processing systems, can be used as the computer system/server 802. Alternatively, to the described information processing system 800, further examples are able to be implemented in relatively small, limited purpose processors to implement the above described processing. In an example, such processors are able to be integrated with or nearby battery cell packs that are deployed in various applications. Examples of these processors are able to include any combination of general purpose processing hardware, dedicated processing hardware such as dedicated multiply and accumulate circuits, other elements, or combinations of these.

The components of the computer system/server 802 can include but are not limited to, one or more processors or processing units 804, a system memory 806, and a bus 808 that couples various system components including the system memory 806 to the processor 804. The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 806 can include computer system readable media in the form of volatile memory, such as random access memory (RAM) 810 and/or cache memory 812. The computer system/server 802 can further include other removable/non-removable, volatile/non-volatile computer system storage media. By way of example only, a storage system 814 can be provided for reading from and writing to a non-removable or removable, non-volatile media such as one or more solid-state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of an example of the present disclosure.

Program/utility 816, having a set of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of examples of the present disclosure.

The computer system/server 802 can also communicate with one or more external devices 820 such as a keyboard, a pointing device, a display 822, etc.; one or more devices that enable a user to interact with the computer system/server 802; and/or any devices, e.g., network card, modem, etc., that enable computer system/server 802 to communicate with one or more other computing devices. Such communication can occur via I/O interfaces 824. Still yet, the computer system/server 802 can communicate with one or more networks such as a local area network (LAN), a general wide area network (WAN), and/or a public network, e.g., the Internet, via network adapter 826. As depicted, the network adapter 826 communicates with the other components of the computer system/server 802 via the bus 808. Other hardware and/or software components can also be used in conjunction with the information processing system 800.

In one example, a method of determining a frequency reference offset between a transmitter and a receiver 500 includes creating a number of time sample vectors 502 where each time sample vector contains a time sample sequence of a received chirp period within a sequence of chirp periods. The method also includes calculating, for each respective pair of time sample vectors in the number of time sample vectors, a respective product vector for each pair of time sample vectors 504 and summing each respective product vector of each pair of time sample vectors into an accumulated value vector 506. The method further includes calculating a Discrete Fourier Transform of the accumulated value vector 508, determining a detected frequency based on a frequency corresponding to an element of the Discrete Fourier Transform that has an amplitude higher than other elements of the Discrete Fourier Transform 510, and determining a frequency reference offset between a transmitter of the received chirp period and a receiver of the received chirp period based on the detected frequency 512.

In another example, a received signal processing circuit 102 includes a digitizer circuit 124 that, when operating, is configured to create a number of time sample vectors where each time sample vector contains a time sample sequence of a received chirp period within a sequence of chirp periods 502. The received signal processing circuit also includes a receive processing circuit 128 that, when operating, is configured to calculate, for each respective pair of time sample vectors in the number of time sample vectors, a respective product vector for each pair of time sample vectors 504; sum each respective product vector of each pair of time sample vectors into an accumulated value vector 506; calculate a Discrete Fourier Transform of the accumulated value vector 508; determine a detected frequency based on a frequency corresponding to an element of the Discrete Fourier Transform that has an amplitude higher than other elements of the Discrete Fourier Transform 510; and determine a frequency reference offset between a transmitter of the received chirp period and a receiver of the received chirp period based on the detected frequency 512.

In a further example, a signal processing circuit 102 includes a frequency reference input configured to receive a frequency reference signal 130, a chirp PLL circuit 134 configured to generate a chirped local oscillator waveform 136, a mixer circuit 122 configured to down convert received radio frequency signals 104, 142 based on the chirped local oscillator waveform to create a down-converted received baseband signal 123. The signal processing circuit also includes a digitizer circuit 124 that, when operating, is configured to create a number of time sample vectors where each time sample vector contains a time sample sequence of a received chirp period within a sequence of chirp periods of the down-converted received baseband signal 502. The signal processing circuit also includes a receive processing circuit 128 that, when operating, is configured to: calculate, for each respective pair of time sample vectors in the number of time sample vectors, a respective product vector for each pair of time sample vectors 504; sum each respective product vector of each pair of time sample vectors into an accumulated value vector 506; calculate a Discrete Fourier Transform of the accumulated value vector 508; determine a detected frequency based on a frequency corresponding to an element of the Discrete Fourier Transform that has an amplitude higher than other elements of the Discrete Fourier Transform 510; and determine a frequency reference offset between a transmitter of the received chirp period and the frequency reference signal 512.

The term "coupled", as used herein, is defined as "connected" and encompasses the coupling of devices that may be physically, electrically or communicatively connected, although the coupling may not necessarily be directly and not necessarily be mechanical. The term "configured to" describes hardware, software, or a combination of hardware and software that is adapted to, set up, arranged, built, composed, constructed, designed, or that has any combination of these characteristics to carry out a given function. The term "adapted to" describes hardware, software, or a combination of hardware and software that is capable of, able to accommodate, to make, or that is suitable to carry out a given function.

The terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The term "coupled", as used herein, is not intended to be limited to a direct coupling or a mechanical coupling, and that one or more additional elements may be interposed between two elements that are coupled.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit" or "system".

The invention may be a system, a method, and/or a computer program product. The computer program product may include a computer-readable storage medium (or media) having computer readable program instructions thereon for causing a processor to carry out aspects of the invention.

In one embodiment, the computer program product includes a non-transitory storage medium readable by a processing circuit and storing instructions for execution by the processing circuit for performing a method. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media, e.g., light pulses passing through a fiber-optic cable), or electrical signals transmitted through a wire.

Computer-readable program instructions for carrying out operations of the invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, and conventional procedural programming languages, such as the “C” programming language or similar programming languages. The computer-readable program instructions may execute entirely or partly on a user’s computer or entirely or partly on a remote computer or server. In the latter scenario, the remote computer may be connected to the user’s computer through any type of network, including a local area network (LAN), a wide area network (WAN), an Ultra-Wide Band (UWB) network, or the connection may be made to an external computer (for example, through the Internet). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer, create means for implementing the functions/acts specified in the flowchart and/or block diagram blocks. These computer-readable program instructions may also be stored in a computer-readable storage medium that can direct a computer to function in a particular manner, such that the computer-readable storage medium having instructions stored therein comprises an article of manufacture including instructions which implement aspects of the function/act specified in the flowchart and/or block diagram block or blocks.

The description of the present disclosure has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the invention.

What is claimed is:

1. A method of determining a frequency reference offset between a transmitter and a receiver, the method comprising:

creating a number of time sample vectors where each time sample vector contains a time sample sequence of a received chirp period within a sequence of chirp periods;

processing a plurality of time sample vector pairs, wherein each time sample vector pair comprises a corresponding first time sample vector and a corresponding second time sample vector from within the number of time sample vectors, and wherein the processing comprises:

calculating a plurality of product vectors, wherein each product vector in the plurality of product vectors comprises a product of the first time sample vector and the second time sample vector within a corresponding time sample vector pair within the plurality of time sample vector pairs;

summing each product vector in the plurality of product vectors into an accumulated value vector;

calculating a Discrete Fourier Transform of the accumulated value vector; determining a detected frequency based on a frequency corresponding to an element of the Discrete Fourier Transform that has an amplitude higher than other elements of the Discrete Fourier Transform; and determining a frequency reference offset between a transmitter of the received chirp period and a receiver of the received chirp period based on the detected frequency.

2. The method of claim 1, wherein determining the detected frequency is based on a frequency corresponding to an element of the Discrete Fourier Transform of the accumulated value vector that has a maximum absolute value.

3. The method of claim 1, further comprising scaling a frequency of the frequency reference of the receiver based on the frequency reference offset.

4. The method of claim 1, further comprising adjusting data captured by the receiver to compensate for the frequency reference offset.

5. The method of claim 1, further comprising adjusting at least one of a local oscillator or a sample rate of an analog-to-digital converter of the receiver based on the frequency reference offset.

6. The method of claim 1, further comprising:

creating a carrier frequency offset compensation vector based on the frequency reference offset;

compensating values in the number of time sample vectors for a determined carrier frequency offset based on the carrier frequency offset compensation vector;

creating a chirp frequency slope offset compensation vector based on the frequency reference offset;

compensating values in the number of time sample vectors for chirp frequency slope offset based on the chirp frequency slope offset compensation vector;

creating a chirp center frequency drift compensation matrix based on the frequency reference offset; and compensating values in the number of time sample vectors for chirp center frequency drift based on the chirp center frequency drift compensation matrix.

7. The method of claim 6, wherein:

wherein the carrier frequency offset compensation vector, $rot_{cfo}(t)$, is defined by $$e^{-2\pi j \widehat{\delta_t} f_{carr} t};$$

wherein the chirp center frequency drift compensation matrix, $rot_{drift}(t, k)$, is defined by $e^{-2\pi j\mu\hat{\delta}_t kT_{SWt}}$; and the chirp frequency slope offset compensation vector, $rot_{stope}(t)$, is defined by $$e^{-2\pi j\mu\widehat{\delta_t} t^2}.$$

8. The method of claim 1, wherein creating a number of time sample vectors comprises:

receiving the sequence of chirp periods;

digitizing and calculating, for time samples in each chirp period in the sequence of chirp periods, corresponding Discrete Fourier Transform; and storing the each corresponding Discrete Fourier Transform into a Fourier Transform storage, and wherein calculating the plurality of product vectors comprises processing a plurality of Discrete Fourier Transform pairs, wherein each Discrete Fourier Transform pair comprises a corresponding first Discrete Fourier Transform and a corresponding second Discrete Fourier Transform stored within the Fourier Transform storage, and wherein processing the plurality of Discrete Fourier Transform pairs comprises:

calculating, for each Discrete Fourier Transform pair, a corresponding pair of inverse Discrete Fourier Transform vectors; and multiplying corresponding elements of each respective pair of inverse Discrete Fourier Transform vectors to calculate the respective product vector.

9. The method of claim 8, wherein the sequence of chirp periods contains a total number of chirps divided into a first duration and a second duration;

wherein the number of time sample vectors comprises a first plurality of time sample vectors where each time sample vector in the first plurality of time sample vectors comprises a time sample sequence of a corresponding received chirp period in the first duration, wherein the number of time sample vectors comprises a second plurality of time sample vectors where each time sample vector in the second plurality of time sample vectors comprises a time sample sequence of a corresponding received chirp period in the second duration, and wherein the summing each product vector in the plurality of product vectors into the accumulated value vector comprises summing each time sample vector in the first plurality of time sample vectors and each time sample vector in the second plurality of time sample vectors.

10. The method of claim 9, wherein the first duration comprises half of the total number of chirps.

11. A received signal processing circuit, comprising:

a digitizer circuit that, when operating, is configured to create a number of time sample vectors where each time sample vector contains a time sample sequence of a received chirp period within a sequence of chirp periods;

a receive processing circuit that, when operating, is configured to process a plurality of time sample vector pairs, wherein each time sample vector pair comprises a corresponding first time sample vector and a corresponding second time sample vector from within the number of time sample vectors, and wherein processing by the receive processing circuit comprises:

calculating a plurality of product vectors, wherein each product vector in the plurality of product vectors comprises a product of the first time sample vector and the second time sample vector within a corresponding of time sample vector pair within the plurality of time sample vector pairs;

summing each product vector in the plurality of product vectors into an accumulated value vector;

calculate a Discrete Fourier Transform of the accumulated value vector;

determining a detected frequency based on a frequency corresponding to an element of the Discrete Fourier Transform that has an amplitude higher than other elements of the Discrete Fourier Transform; and determining a frequency reference offset between a transmitter of the received chirp period and a receiver of the received chirp period based on the detected frequency.

12. The received signal processing circuit of claim 11, wherein the receive processing circuit is configured to, when operating, determine the detected frequency is based on a frequency corresponding to an element of the Discrete Fourier Transform of the accumulated value vector that has a maximum absolute value.

13. The received signal processing circuit of claim 11, wherein the receive processing circuit is further configured to, when operating, scale a frequency of the frequency reference of the receiver based on the frequency reference offset.

14. The received signal processing circuit of claim 11, wherein the receive processing circuit is further configured to, when operating, adjust data captured by the receiver to compensate for the frequency reference offset.

15. The received signal processing circuit of claim 11, wherein the receive processing circuit is further configured to, when operating, adjust at least one of a local oscillator or a sample rate of an analog-to-digital converter of the receiver based on the frequency reference offset.

16. The received signal processing circuit of claim 11, wherein the receive processing circuit is further configured to, when operating, create a number of time sample vectors by at least:

receiving the sequence of chirp periods;

digitizing and calculating, for time samples in each chirp period in the sequence of chirp periods, a corresponding Discrete Fourier Transform; and storing the each corresponding Discrete Fourier Transform into a Fourier Transform storage, and wherein the receive processing circuit is further configured to, when operating, calculate the plurality of product vectors by at least processing a plurality of Discrete Fourier Transform pairs, wherein each Discrete Fourier Transform pair comprises a corresponding first Discrete Fourier Transform and a corresponding second Discrete Fourier Transform stored within the Fourier Transform storage, and wherein processing the plurality of Discrete Fourier Transform pairs comprises:

calculating, for each Discrete Fourier Transform pair, a corresponding pair of inverse Discrete Fourier Transform vectors; and multiplying corresponding elements of each respective pair of inverse Discrete Fourier Transform vectors to calculate the respective product vector.

17. The received signal processing circuit of claim 11, wherein the sequence of chirp periods contains a total number of chirps divided into a first duration and a second duration;

wherein the number of time sample vectors comprises a first plurality of time sample vectors where each time sample vector in the first plurality of time sample vectors comprises a time sample sequence of a corresponding received chirp period in the first duration, wherein the number of time sample vectors comprises a second plurality of time sample vectors where each time sample vector in the second plurality of time sample vectors comprises a time sample sequence of a corresponding received chirp period in the second duration, and wherein the receive processing circuit is further configured to, when operating, sum each respective product vector of in the plurality of product vectors each pair of time sample vectors into the accumulated value vector by at least summing each time sample vector in the first plurality of time sample vectors and each time sample vector in the second plurality of time sample vectors.

18. The received signal processing circuit of claim 17, wherein the first duration and the second duration comprise an equal number of chirps.

19. The received signal processing circuit of claim 18, wherein the first duration comprises half of the total number of chirps.

20. A signal processing circuit, comprising:

a frequency reference input configured to receive a frequency reference signal;

a chirp Phase Locked Loop (PLL) circuit configured to generate a chirped local oscillator waveform;

a mixer circuit configured to down convert received radio frequency signals based on the chirped local oscillator waveform to create a down-converted received baseband signal;

a digitizer circuit that, when operating, is configured to create a number of time sample vectors where each time sample vector contains a time sample sequence of a received chirp period within a sequence of chirp periods of the down-converted received baseband signal;

a receive processing circuit that, when operating, is configured to process a plurality of time sample vector pairs, wherein each time sample vector pair comprises a corresponding first time sample vector and a corresponding second time sample vector from within the number of time sample vectors, and wherein processing by the receive processing circuit comprises:

calculate a plurality of product vectors, wherein each product vector in the plurality of product vectors comprises a product of the first time sample vector and the second time sample vector within a corresponding time sample vector pair within the plurality of time sample vector pairs;

sum each product vector in the plurality of product vectors into an accumulated value vector;

calculate a Discrete Fourier Transform of the accumulated value vector;

determine a detected frequency based on a frequency corresponding to an element of the Discrete Fourier Transform that has an amplitude higher than other elements of the Discrete Fourier Transform; and determine a frequency reference offset between a transmitter of the received chirp period and the frequency reference signal.

* * * * *